United States Patent

[11] 3,584,511

[72] Inventor William J. Collins
7005 Madison St., Merrillville, Ind. 46410
[21] Appl. No. 857,870
[22] Filed Sept. 15, 1969
[45] Patented June 15, 1971
Continuation-in-part of application Ser. No. 713,640, Mar. 18, 1968.

[54] DEVICE FOR SAMPLING AND EXTRACTING MOLTEN METAL
7 Claims, 4 Drawing Figs.
[52] U.S. Cl..................................................... 73/425.4,
29/254, 29/267
[51] Int. Cl....................................................... G01n 1/10
[50] Field of Search........................................... 73/421
MM; 29/267, 249; 254/120

[56] References Cited
UNITED STATES PATENTS
2,170,461  8/1939  Pepperdine .................. 29/254

3,415,124  12/1968  Collins .......................... 73/421 MM
FOREIGN PATENTS
734,814  4/1943  Germany...................... 29/267

Primary Examiner—S. Clement Swisher
Attorney—Charles S. Penfold

ABSTRACT: A molten metal sampler of the type in which a sample receiving means is fixed in the end of an elongated cardboard tube so that when the end of tube is inserted into a bath of molten metal, the sample is solidified in the receiver is provided with a device for extracting the receiver. The extractor includes a long rod having a means on one end for grasping the receiver intended to be inserted through the unoccupied end of the cardboard tube and a slidable cap for engaging the unoccupied end of the tube. One embodiment utilizes the percussion system for jarring the receiver free from the tube and the other embodiment utilizes a leverage system for developing sufficient force to loosen the receiver.

PATENTED JUN 15 1971

3,584,511

INVENTOR.
WILLIAM J. COLLINS
BY
Charles S. Penfold
ATTORNEY 3,584,511

DEVICE FOR SAMPLING AND EXTRACTING MOLTEN METAL

This application is a continuation-in-part of my application Ser. No. 713,640 filed Mar. 18, 1968.

The subject invention relates generally to means utilized in conjunction with testing equipment and more particularly is directed to a device which is adapted for use in obtaining a sample of molten metal from a chamber for analysis.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

An important object of the invention is to provide a device which, among other things, comprises an elongated tube, means mounted in a lower end of the tube for receiving a sample of a hot liquid, such as molten metal, and extraction means which may be extended downwardly into an upper end of the tube for connection with the receiving means whereby to facilitate its withdrawal or removal from the tube after a sample of liquid has been obtained.

A specific object of the invention is to provide a sampling device in which the receiving means, above referred to, is preferably designed and constructed to include a head or an enlargement which is of a size somewhat smaller than an inside dimension of the tube so that the extraction means may be readily connected to the head for effecting release and withdrawal of the receiving means from the tube.

A significant object of the invention is to provide extraction means which offers advantages with respect to manufacture and assembly, efficiency, durability and safety.

Other objects and advantages of the invention will become apparent after the description hereinafter set forth is considered in conjunction with the drawings annexed hereto.

Referring to the drawings.

Figure 1:
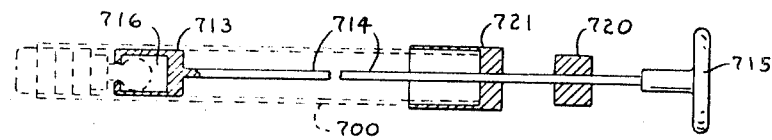
FIG. 1 illustrates a manually operable structure which may be utilized to remove a receiving means and a sample contained therein from the device.
Figure 3:
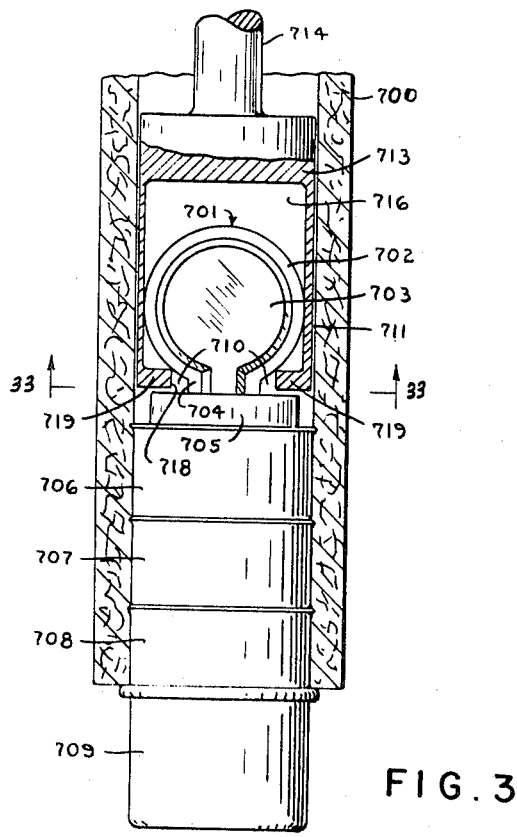
FIG. 3 is an enlarged vertical section of a sampling device and certain details of the extractor shown in FIG. 2.
Figure 4:
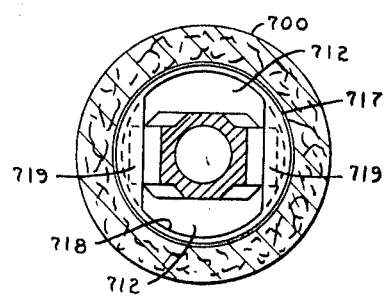
FIG. 4 is a transverse section taken substantially on line 4—4 of FIG. 3 illustrating further details with respect to obtaining release of the receiving means and sample from the device.

FIG. 1 of the drawing discloses a structure for extracting a sample from a device of the character shown in FIGS. 3 and 4. This device preferably includes a housing or elongated tube 700 containing a receiving means generally designated 701 having a head 702 forming a chamber 703 and a tubular extension 704 which is anchored by a mass of cement in a tubular member 705, with another mass about the member for securing the receiving means and member in a upper cup 706 as substantially disclosed in FIG. 14 of my U.S. Pat. No. 3,415,124 dated Dec. 10, 1968. This device may also include three additional cups or caps 707, 708, and 709 which generally correspond to those in the patent for the purpose stated therein. It will be observed that there is an annular space 710 between the head 702 and the upper end of the member 705; an annular space 711 between the head and the inner cylindrical surface of the housing; and spaces 712 between outer faces of the head and the inner surface of the housing.

The extracting structure preferably includes a fitting 713, an elongated rod 714 secured to the fitting and a handle 715. This fitting is formed with a socket or cavity 716, and an end wall 717 having an oblong opening 718 therein leading to the socket. As a result of this opening the bottom wall has a pair of diametrically disposed chordal-shaped abutments 719. The organization is preferably such that after the device is used to obtain a sample, the fitting 713 of the structure may be inserted into the housing 700 and rotated to a position so that the socket will accommodate the head 702 of the receiving means via the opening, after which the fitting is rotated 90 degrees by the handle 715 so that the abutments 719 will engage the underside of the head as evidenced in FIG. 3, whereupon a sharp jerk or pull on the rod will dislodge the receiving means and sample contained therein for extraction from the housing. If desired, the rod may be provided with a fixed solid abutment 720 and a relatively heavy metal cap or element 721 carried by the rod may be slid therealong as well as on the housing and sharply against the abutment whereby to facilitate jarring or breaking loose the receiving means and sample to promote their release from the housing.

Figure 2:
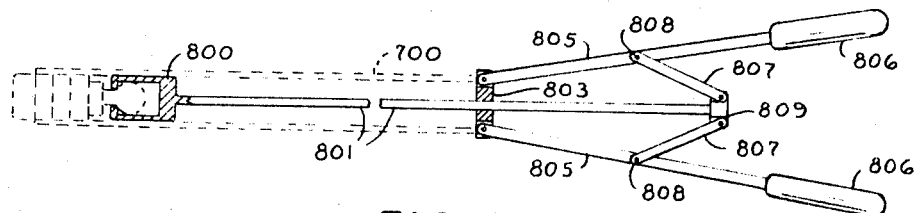
FIG. 2 is a modified extractor which may be utilized to remove a receiving means and a sample from a device.

A modified extracting structure is exemplified in FIG. 2. This structure includes a fitting 800 and a rod 801 which respectively correspond to the fitting 713 and the rod 714, above referred to, and a linkage and lever assembly generally designated 802. This assembly preferably comprises an annular member 803 which is adapted to abut the outer end of the housing 700 and provided with an aperture through which the rod 801 slidably extends. A pair of manually operable levers 805 have inner ends which are pivotally connected to the member 803 and outer ends carrying handles 806. A pair of links 807 have inner ends respectively pivotally connected at 808 to the levers at locations intermediate their lengths and outer ends which are pivotally connected to a fitting 809 which is preferably fixedly secured against rotation to an outer end of the rod. With this novel organization the fitting 800 may be inserted into the housing 700 to accommodate the receiving means and sample by manipulating the levers and then by sharply moving the levers toward one another the links will force the member 803 against the housing and the rod outwardly to release the receiving means and sample for extraction. Obviously, extracting means other than those exemplified in FIGS. 1 and 2 may be employed.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A device for obtaining a sample of molten metal comprising: a housing having an upper open end, receiving means supported in a lower end of said housing, means providing a passage communicating with said receiving means so that when the device is dipped in a bath of molten metal a sample thereof will flow through said passage into said receiving means, and means insertable into said open end for connection with said receiving means whereby to facilitate its extraction from the housing after the device has been removed from the bath and the metal sample in the receiving means has solidified.

2. The device defined in claim 1, in which said insertable means includes an elongated rod provided with a socket for accommodating at least a portion of said receiving means.

3. The device defined in claim 1, in which said insertable means comprises: an elongated rod having an inner end carrying a socket for accommodating the receiving means and an outer end carrying a member, a fitting slidable on the rod for engaging an end of the housing, a pair of levers pivotally connected to the fitting, and a pair of links pivotally connected to the levers and member whereby operation of the levers will cause the fitting to slide on the rod and engage the housing and the member to move away from the fitting and thereby exert a pulling force on the receiving through the agency of the socket.

4. A device for obtaining a sample of molten metal comprising: a tubular open-ended housing, a receiving means supported within the confines of a lower end of said housing and provided with an entrance through which a sample will flow into the receiving means when the device is immersed in a bath of molten metal, said receiving means having at least one cross-sectional dimension which is less than the internal cross-dimension of said housing, and a tool insertable into an upper end of the housing to accommodate said receiving means whereby to facilitate its extraction from the housing after the device is removed from the bath.

5. An extractor structure comprising: an elongated rod provided with a solid fitting adapted for embraceably receiving a sampling device located at one end of an elongated tubular housing and a handle at its opposite end; a cup slidably mounted on said rod for engaging and receiving an opposite end of such a housing, and a solid abutment fixed on said rod between said handle and said cup so that the latter may be struck against said abutment whereby to facilitate movement of such a device toward the opposite end of such a housing.

6. The device defined in claim 1, in which said receiving means has an enlarged portion, and said insertable means includes an elongated rod provided with a socket having an oblong entrance opening whereby when said enlarged portion is received in said socket through said opening and rotated to a predetermined position it will be temporarily locked in said socket to facilitate extraction of said receiving means.

7. The device defined in claim 1, in which said insertable means comprises: an elongated rod having an inner end carrying a socket for accommodating the receiving means and also having an outer extremity, a solid abutment fixed on said outer extremity, and a fitting slidable on said extremity for striking said abutment whereby to assist in loosening said receiving means in said housing.